US009244742B2

(12) United States Patent
Gulati et al.

(10) Patent No.: US 9,244,742 B2
(45) Date of Patent: Jan. 26, 2016

(54) DISTRIBUTED DEMAND-BASED STORAGE QUALITY OF SERVICE MANAGEMENT USING RESOURCE POOLING

(75) Inventors: Ajay Gulati, Palo Alto, CA (US); Ganesha Shanmuganathan, Santa Clara, CA (US); Peter Joseph Varman, Houston, TX (US)

(73) Assignee: VMware, Inc., Palo Alto, CA (US)

( * ) Notice: Subject to any disclaimer, the term of this patent is extended or adjusted under 35 U.S.C. 154(b) by 703 days.

(21) Appl. No.: 13/485,615

(22) Filed: May 31, 2012

(65) Prior Publication Data

US 2013/0326064 A1 Dec. 5, 2013

(51) Int. Cl.
*G06F 9/50* (2006.01)
*G06F 9/48* (2006.01)
*G06F 9/455* (2006.01)

(52) U.S. Cl.
CPC ............ *G06F 9/5061* (2013.01); *G06F 9/4881* (2013.01); *G06F 9/45533* (2013.01)

(58) Field of Classification Search
None
See application file for complete search history.

(56) References Cited

U.S. PATENT DOCUMENTS

| 7,480,912 | B2 * | 1/2009 | Arnold et al. | 718/104 |
|---|---|---|---|---|
| 2004/0194095 | A1 * | 9/2004 | Lumb et al. | 718/100 |
| 2005/0246705 | A1 * | 11/2005 | Etelson et al. | 718/100 |
| 2006/0294238 | A1 | 12/2006 | Naik et al. | |
| 2007/0028068 | A1 | 2/2007 | Golding | |
| 2008/0008094 | A1 * | 1/2008 | Gilfix | 370/235 |
| 2008/0130495 | A1 | 6/2008 | Dos Remedios et al. | |
| 2009/0296734 | A1 | 12/2009 | Nag | |
| 2010/0306382 | A1 * | 12/2010 | Cardosa et al. | 709/226 |
| 2011/0066770 | A1 * | 3/2011 | Muppirala et al. | 710/39 |
| 2011/0072138 | A1 * | 3/2011 | Canturk et al. | 709/226 |
| 2011/0243553 | A1 | 10/2011 | Russell | |

OTHER PUBLICATIONS

"DRS Performance and Best Practices", 2008, VMWare, Inc, pp. 1-19.*
International Searching Authority, Notification of Transmittal of the International Search Report and the Written Opinion of the International Searching Authority, or the Declaration; International Search Report mailed Aug. 23, 2013; Written Opinion of the International Searching Authority; International Patent Application No. PCT/US2013/043473 filed May 30, 2013, 11 pages.
Clemens, A.T. et al., "Decentralized Deduplication in SAN CLuster FIle Systems," Usenix ATC, 2009.
Demers, A. et al., "Analysis and Simulation of a Fair Queuing Algorithm," Journal of Internet-working Research and Experience, 1(1): 3-26, Sep. 1990.

(Continued)

*Primary Examiner* — Meng An
*Assistant Examiner* — Michael Ayers

(57) ABSTRACT

A system and method for providing quality of service (QoS) for clients running on host computers to access a common resource uses a resource pool module and a local scheduler in at least one of the host computers. The resource pool module operates to compute an entitlement of each client for the common resource based on a current capacity for the common resource and demands of the clients for the common resource. In addition, the resource pool module operates to assign a portion of the computed current capacity for the common resource to a particular host computer using the computed entitlement of each client running on the particular host computer. The local scheduler operates to allocate the portion of the computed current capacity among the clients running on the particular host computer.

18 Claims, 7 Drawing Sheets

(56) References Cited

OTHER PUBLICATIONS

Floyd, S. et al., "Link-sharing and Resource Management Models for Packet Networks," IEEE/ACM Transactions on Networking, 3:365-386, 1995.
Goyal, P. et al., "A Hierarchical CPU Scheduler for Multimedia Operating Systems," Usenix OSDI'96, 1996.
Goyal, P. et al., "Start-time Fair Queuing: A Scheduling Algorithm for Integrated Services Packet Switching Networks," Technical Report CS-TR-96-02, UT Austin, Jan. 1996.
Gulati A. et al., "PARDA: Proportionate Allocation of Resources for Distributed Storage Access," Usenix FAST '09, Feb. 2009.
Gulati A. et al.; "mClock: Handling Throughput Variability for Hypervisor IO Scheduling," Usenix OSDI '10, 2010.
Gulati, A. et al., "PESTO: Online Storage Performance Management in Virtualized Datacenters," Symposium on Cloud Computing (SOCC '11), 2011.
Huang, L. et al., "Multi-dimensional Storage Virtualization," ACM Sigmetrics, Jun. 2004.
Jin, C. et al., "FAST TCP: Motivation, Architecture, Algorithms, Performance," Proceedings of IEEE Infocom, Mar. 2004.
Jin, W. et al., "Interposed Proportional Sharing for a Storage Service Utility," ACM Sigmetrics; pp. 37-48, Jun. 2004.
Karlsson, M. et al., "Triage: Performance Differentiation for Storage Systems Using Adaptive Control"; Trans. storage; 1(4): 457-480, Nov. 2005.
Lumb, C. et al., "Facade: Virtual Storage Devices with Performance Guarantees," Usenix FAST, Mar. 2003.
Povzner, A. et al., "Efficient Guaranteed Disk Request Scheduling with Fahrrad," Eurosys, Mar. 2008.
Stoica, I., et al., "On the Duality between Resource Reservation and Proportional Share Resource Allocation," Multimedia Computing and Networking, 3020:207-214, 1997.
VMware, Inc., "vSphere Resource Management Guide," ESX 4.1, ESXi 4.1, vCenter Server 4.1, 2010.
Wachs, M. et al., "Argon: performance insulation for shared storage servers," FAST '07, 2007.
Waldspurger, C.A., "Memory Resource Management in VMware ESX Server," Usenix OSDI, Dec. 2002.
Wang, Y. et al., "Proportional-Share Scheduling for Distributed Storage Systems," Usenix FAST '07, 2007.
Wong, T.M. et al.; "Zygaria: Storage performance as managed resource"; In Proc. of RTAS; pp. 125-134; Apr. 2006.
Wu, J.C. et al.,"Hierarchical Disk Sharing for Multimedia Systems," ACM NOSSDAV '05, 2005.
Zhang, J. et al., "Storage Performance Virtualization via Throughput and Latency Control," Proc. of MASCOTS, Sep. 2005.
Dell, DVD Store, http://en.community.dell.com/techcenter/extras/w/wiki/dvd-store.aspx, accessed Apr. 16, 2013.
McDougall, R., "Filebench Tutorial," 2004.
VMware, Inc., "Introduction to VMware Infrastructure," 2006-2007.

\* cited by examiner

DISTRIBUTED DEMAND-BASED STORAGE QUALITY OF SERVICE MANAGEMENT USING RESOURCE POOLING

BACKGROUND

Sharing resources for networked computers, such as data storage facilities, can increase efficiency by reducing maintenance and operating costs, allowing flexibility with respect to individual resource usage, and simplifying resource management. With respect to shared storage, the benefits include data consolidation, universal access to data, ease of storage management, and support for live migration of virtual machines (VMs) for virtualized environments.

An important aspect of sharing resources is Quality of Service (QoS), which refers to resource management methodologies whereby the shared resources are allocated among a plurality of users or clients according to a policy. The policy may guarantee a minimum and/or maximum level of service (e.g., as a percentage of shared resource). It is also common to distribute services according to assigned resource "shares," which are alternatively referred to in literature as "weights," so that each client is provided a level of service that compares to its peers at the same ratio as the assigned shares. A combination of these approaches is possible for a particular policy. Thus, QoS suggests an ability to evenly distribute services or arbitrarily assign priority to selected applications, users, or data flows to maintain control over workload performance in shared storage environments.

SUMMARY

A system and method for providing Quality of Service (QoS) for clients running on host computers to access a common resource uses a resource pool module and a local scheduler in at least one of the host computers. The resource pool module operates to compute an entitlement of each client for the common resource based on a current capacity for the common resource and demands of the clients for the common resource. In addition, the resource pool module operates to assign a portion of the computed current capacity for the common resource to a particular host computer using the computed entitlement of each client running on the particular host computer. The local scheduler operates to allocate the portion of the computed current capacity among the clients running on the particular host computer.

A method for providing QoS for clients running on host computers to access a common resource in accordance with an embodiment of the invention comprises computing a current capacity for the common resource based on a global average latency for accessing the common resource by the clients, computing an entitlement of each client for the common resource based on the computed current capacity and demands of the clients for the common resource, assigning a portion of the computed current capacity for the common resource to a particular host computer using the computed entitlement of each client running on the particular host computer, and allocating the portion of the computed current capacity among the clients running on the particular host computer. In some embodiments, the steps of this method are performed when program instructions contained in a computer-readable storage medium is executed by one or more processors of the host computers.

A system in accordance with an embodiment of the invention comprises at least one processor, a plurality of clients operably connected to the at least one processor, a resource interface with a host queue to store requests from the clients to access a common resource, a resource pool module operably connected to the at least one processor, and a scheduler operably connected to the resource pool module. The resource pool module comprises a first component configured to compute a current capacity for the common resource based on a global average latency for accessing the common resource by the clients, a second component configured to compute an entitlement of each client for the common resource based on the computed current capacity and demands of the clients for the common resource, and a third component configured to assign a portion of the computed current capacity for the common resource to a host computer using the computed entitlement of each client. The scheduler is configured to allocate the portion of the computed current capacity among the at least one client running on the host computer.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
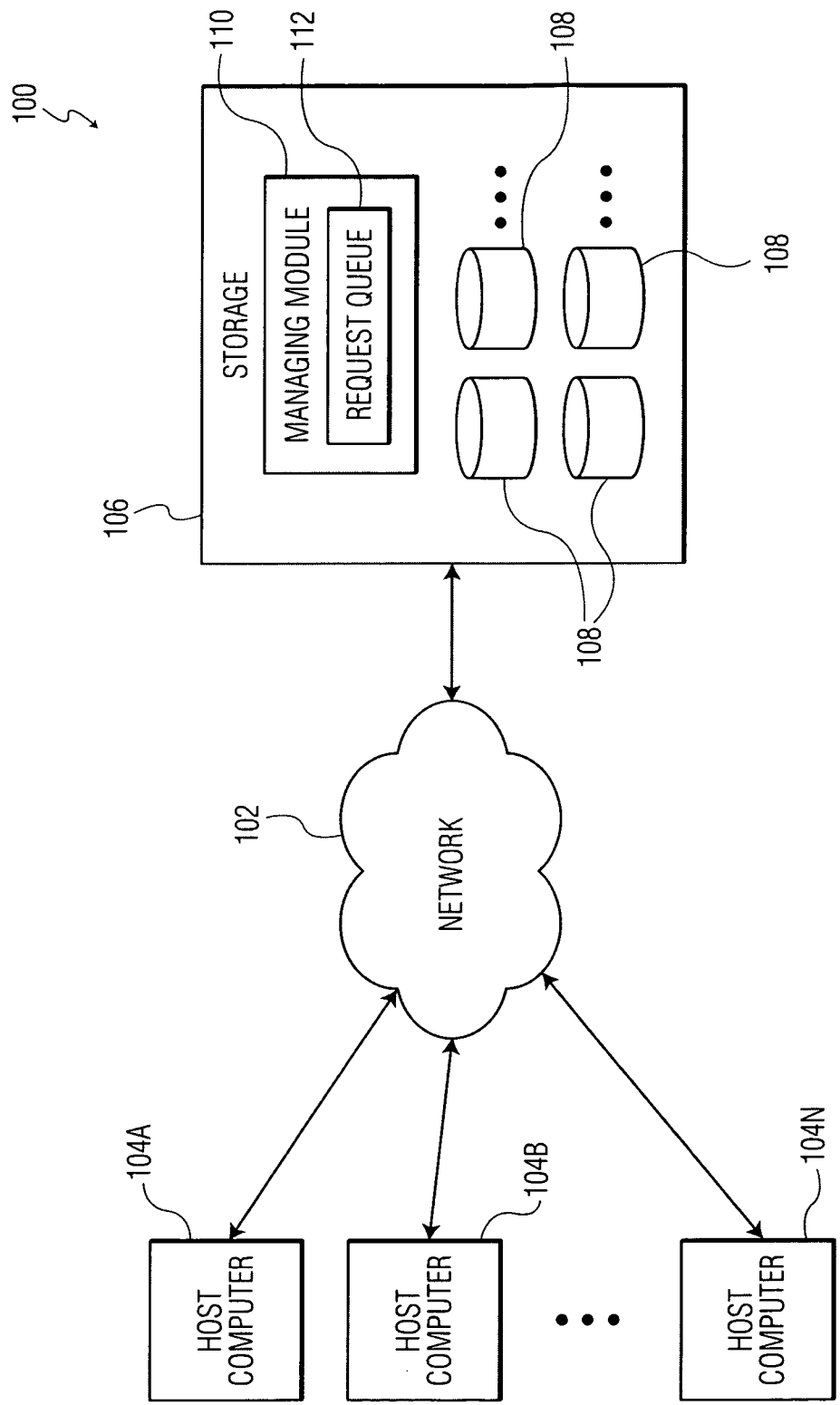
FIG. 1 is a block diagram of a network computer system in accordance with an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Conventional Quality of Service (QoS) techniques with respect to resource management do not provide sufficient controls to accommodate enterprises with different infrastructures and/or objectives. In addition, some convention QoS techniques require a centralized scheduler, which can add complexity to QoS mechanism and can increase susceptibility to system-wide failures.

In view of the limitations and concerns of conventional QoS techniques, there is a need for a QoS management to maintain control over workload performance in shared resource environments without the use of a centralized scheduler.

Turning now to FIG. 1, a network computer system 100 in accordance with an embodiment of the invention is shown. As shown in FIG. 1, the network computer system includes a network 102, a number of host computers 104A, 104B . . . 104N connected to the network, and a shared storage 106 also connected to the network. Thus, each of the host computers 104 is able to access the shared storage via the network and share the resource provided by the storage with the other host computers. Consequently, any process running on any of the host computers can also access the storage via the network. As described in more detail, in the illustrated embodiment, the host computers in a distributed manner implement a demand-based QoS mechanism to maintain control over workload performance with respect to storage resource being shared by the host computers.

The network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, iSCSI, FCoE and HyperSCSI.

The host computers 104A, 104B . . . 104N are physical computer systems that hosts or supports one or more clients so that the clients are executing on the physical computer systems. The host computers may be servers that are commonly found in data centers. As used herein, the term "client" is any software entity that can run on a computer system, such as a software application, a software process or a virtual machine (VM). The host computers are described in more detail below.

The storage 106 is used to store data for the host computers 104A, 104B . . . 104N, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 108, which can be any type of storage devices, such as solid-state devices (SSDs), hard disks or a combination of the two. The storage devices may operate as components of a network-attached storage (NAS) and/or a storage area network (SAN). The storage includes a storage managing module 110, which manages the operation of the storage. The storage managing module maintains a request queue 112, which is a list of pending input/output (IO) request for the storage. In an embodiment, the storage managing module 110 is a computer program executing on one or more computer systems (not shown) of the storage. The storage may support multiple data stores or logical unit numbers (LUNs). Although the storage 106 can be any type of computer data storage, the storage 106 will be described herein as being a storage array.

Figure 2:
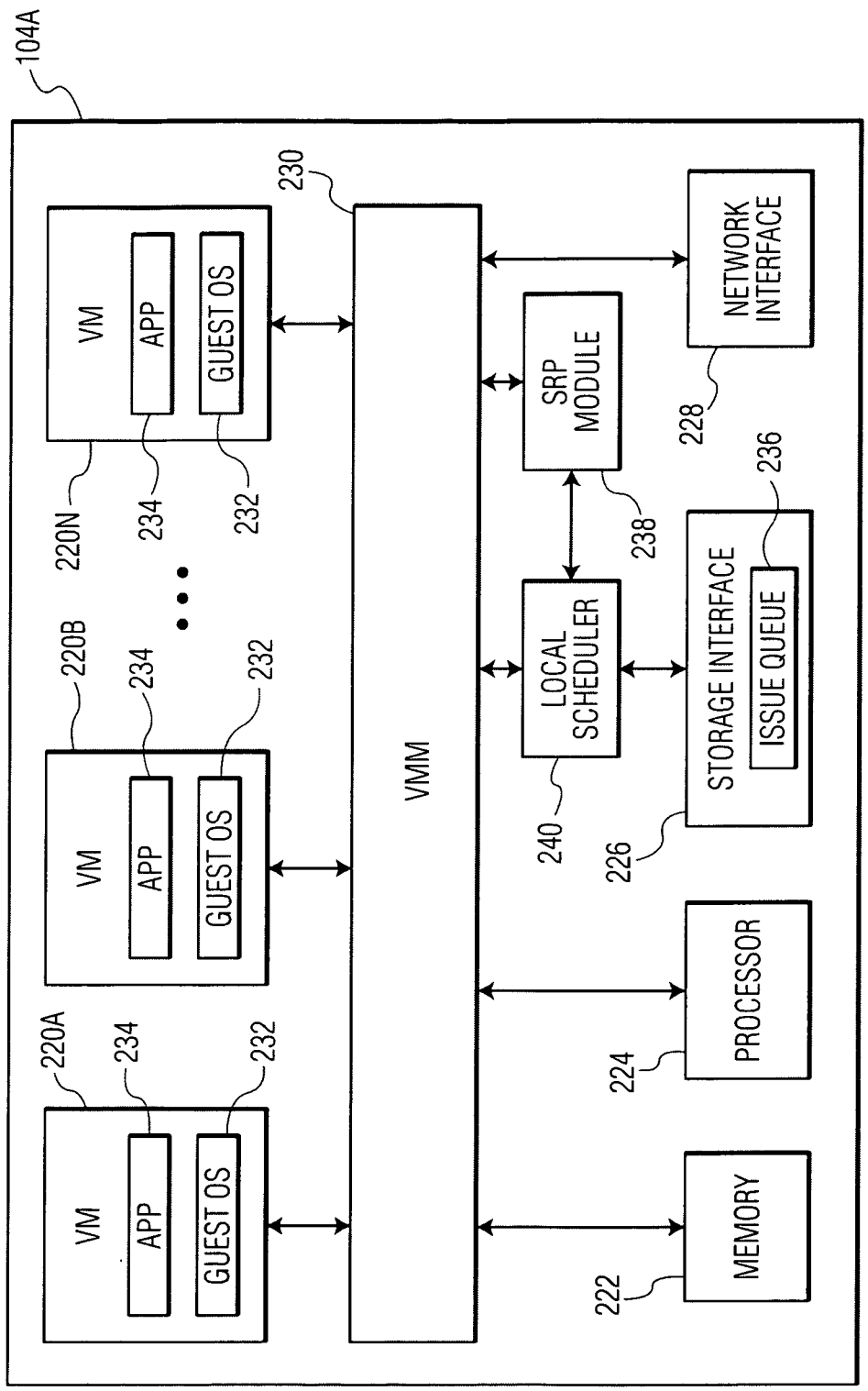
FIG. 2 is a block diagram of a host computer of the network computer system of FIG. 1 in accordance with an embodiment of the invention.

Turning now to FIG. 2, components of the host computer 104A in accordance with an embodiment of the invention are shown. The other host computers 104B . . . 104N are similar to the host computer 104A. Thus, the host computer 104A will be used as an example for the other host computer. In FIG. 2, the physical connections between the various components of the host computer 104A are not illustrated. In the illustrated embodiment, the host computer 104A is configured to support a number of clients 220A, 220B . . . 220N, which are VMs. The number of VMs supported by the host computer can be anywhere from one to more than one hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory 222, which may be random access memory (RAM), is the primary memory of the host computer. The processor 224 can be any type of a processor, such as a central processing unit (CPU) commonly found in a server. The storage interface 226 is an interface that allows that host computer to communicate with the storage array 106. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220N run on top of a virtual machine monitor 230, which is a software interface layer that enables sharing of the hardware resources of the host computer 104A by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other. Each VM includes a guest operating system 232 and one or more guest applications 234. The guest operating system is a master control program of the respective VM and, among other things, the guest operating system forms a software platform on top of which the guest applications run.

Similar to any other computer system connected to the network 102, the VMs 220A, 220B . . . 220N are able to communicate with other computer systems connected to the network using the network interface 228 of the host computer 104A. In addition, the VMs are able to access the storage array 106 using the storage interface 226 of the host computer. Thus, the VMs of the host computer compete for the shared storage resource provided by the storage array for the host computer. Similarly, the host computer competes with other host computers 104B . . . 104N for the shared storage resource.

Each of the host computers 104A, 104B . . . 104N of the network computer system 100 is allowed to keep a certain maximum number of IO requests outstanding at the storage array 106 in an issue queue 236 of the storage interface 226 of that host computer, as illustrated in FIG. 2. The size of the issue queue (also referred to herein as "host queue depth") for a particular host computer reflects the capacity of the storage array to process IO request that is currently allocated to that particular host computer. As described in more detail below, the issue queues in the host computers are used to implement QoS control with respect to the storage resource provided by the storage array.

Due to the competition for the shared common resource, i.e., the shared storage resource provided by the storage array 106, there is a need for a QoS management mechanism in the network computer system 100 to control distributions of the shared storage resource among the different entities, such as the VMs hosted by the host computers 104A, 104B . . . 104N. If the shared resource is to be divided equally among the different VMs, the process of distributing the shared storage resource may be straightforward. However, in certain situations, some of the VMs may need greater amount of the shared storage resource than other VMs. As used herein, an amount of the shared storage resource may be measured in IO operations per second (IOPS), wherein a higher IOPS value means greater access to the shared storage resource. In addition, the needs of the different VMs may vary based on changes in the demands of the VMs for the shared storage resource. Furthermore, in certain situations, the VMs running on different host computers may belong to different groups, which have needs and requirements with respect to access to the shared storage resource. An example of such groups of VMs is described below with reference to FIG. 3.

Figure 3:
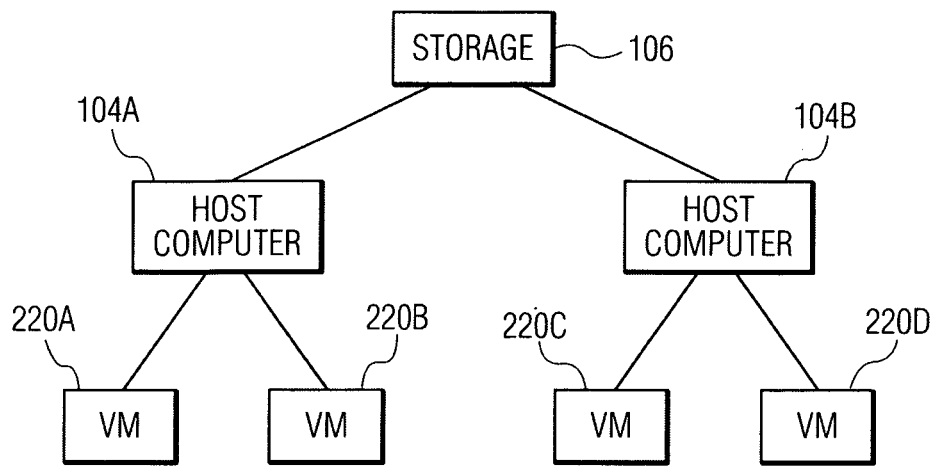
FIG. 3 is a diagram of virtual machines (VMs), host computers and a storage of the network computer to illustrate different groups of VMs in accordance with an embodiment of the invention.

FIG. 3 shows the host computers 104A and 104B connected to the storage array 106 to share the storage resource provided by the storage array. The host computer 104A includes the VMs 220A and 220B. The host computer 104B includes the VM 220C and 220D. In this example, the VM 220A running on the host computer 104A and the VM 220C running on the host computer 104B belong to the sales division of an enterprise. The VM 220B running on the host computer 104A and the VM 220D running on the host computer 104B belong to the finance division of the enterprise. The VMs 220A and 220C of the sales division may be handling sales in different continents, and thus, need an overall reservation of 1,000 IOPS based on the peaks and troughs of demand in the different time zones. The VMs 220B and 220D of the finance division may be running background data analytics, and thus, are restricted to a combined throughput of 500 IOPS to reduce their impact on the critical sales VMs. In addition, someone may want to allocate the 500 IOPS in ratio 1:2 between the VMs based on their importance. This is known as shares control. The QoS management mechanism of the network computers system 100 in accordance with embodiments of the invention is designed to provide a robust QoS control of the shared storage resource to address the requirements of different groups of VMs without the need to have a centralized resource scheduler, which can add complexity to the QoS mechanism and can increase susceptibility to system-wide failures. As described below, the QoS management mechanism of the network computer system uses a concept of storage resource pools (SRP) to manage QoS for clients distributed throughout the network computer system. Thus, the QoS management mechanism of the network computer system will be referred to herein as the SRP-based QoS management mechanism.

The SRP-based QoS management mechanism allows a user, such as a system administrator, to specify the desired QoS using throughput reservation values (lower bounds), limit values (upper bounds) and shares (proportional sharing). These values may be set for any node of a resource pool hierarchical structure, such as individual VMs in the resource pool hierarchical structure and/or groups of related VMs, as conceptually designated by nodes in the resource pool hierarchical structure that are situated at a higher level than the VMs. The reservation values are absolute guarantees that specify the minimum amount of the shared resource that the nodes, e.g., VMs and groups of VMs, in the resource pool hierarchical structure must receive. The limit values specify the maximum allocation that should be made to the nodes in the resource pool hierarchical structure. These values are useful for enforcing strict isolation and restricting tenants for contractually-set IOPS based on their service level objectives (SLOs). The shares provide a measure of relative importance between the nodes in the resource pool hierarchical structure, and are used to prioritize allocation when capacity is constrained.

The SRP-based QoS management mechanism also allows the user to group the clients running on the host computers 104A, 104B . . . 104N in the network computer system 100 into storage resource pools (i.e. SRPs) so that the clients in a particular group or SRP can be treated as a single unit for resource allocation. These units can then be aggregated into larger resource pools or groups to create a resource pool hierarchical structure. The grouping of the clients can be made regardless of the underlying host computers on which the clients are running. Thus, clients running on a particular host computer may belong to different resource pools or groups. Such distributed architectures are very common in virtualized datacenters. The information defining the resource pool hierarchical structure may be stored in a shared file stored in the storage array 106 so that every host computer in the network computer system is able to access this information. Alternatively, the resource pool hierarchical structure information may be broadcasted to other host computers in the network computer system so that every host computer has these values from all the other host computers.

Figure 4:
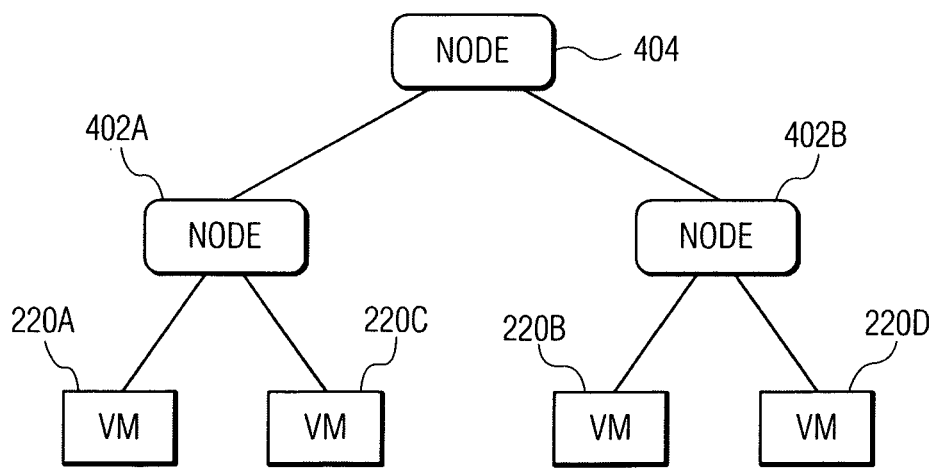
FIG. 4 is a diagram of a resource pool hierarchical structure with VMs in accordance with an embodiment of the invention.

An example of a resource pool hierarchical structure with the VMs 220A, 220B, 220C and 220D is illustrated in FIG. 4. The resource pool hierarchical structure shown in FIG. 4 includes the four VMs 220A, 220B, 220C and 220D, which can be viewed as being nodes in the lowest level of the resource pool hierarchical structure. In this example, the VMs 220A and 220C are grouped together, as illustrated by a node 402A, which can be viewed as the parent node of the two VMs 220A and 220C. Thus, the two VMs 220A and 220C can be viewed as the children or child nodes of the node 402A. Similarly, the VMs 220B and 220D are grouped together, as illustrated by another node 402B, which can be viewed as the parent node of the two VMs 220B and 220D. Thus, the two VMs 220B and 220D can be viewed as the children or child nodes of the node 402B. The two nodes 402A and 402B are further grouped together, as illustrated by a node 404, which is the root node of the resource pool hierarchical structure. The node 404 can also be viewed as the parent node of the two nodes 402A and 402B, and conversely, the two nodes 402A and 402B can be viewed as the children or child nodes of the node 404. This resource pool hierarchical structure may conceptually represent an organizational structure, such as a business enterprise with divisions or departments that use one or more VMs for operation. If representing a business enterprise, the root node 404 of the resource pool hierarchical structure may represent the entire business enterprise, and the two nodes 402A and 402B may represent divisions or departments of the enterprise, such as sales and financial divisions, respectively, where the VMs 220A and 220C operate for the sales division and the VMs 220B and 220D operate for the financial division.

The SRP-based QoS management mechanism uses a storage resource pool (SRP) module 238 and a local scheduling module 240, which are included in each host computer in the network computer system 100, as illustrated in FIG. 2. The SRP module in each host computer cooperatively operates with the SRP modules in the other host computers of the network computer system to determine how much of the capacity of the storage array 106 should be provided to that host computer, which is at least based on aggregate demand on the storage array by clients in the host computer and average latency of the storage array. The SRP module then determines how much of the storage capacity allocated to the host computer should be provided to each client, e.g., each VM, in the host computer. The SRP module also distributes a global reservation value, a global limit value and shares at the root node of a resource pool hierarchical structure down to the clients based on their current individual demands of the shared storage resource, their static reservation, limit and share values. As used herein, a share value is equivalent to the number of assigned shares. In addition, as used herein, static values are those that are set by a user, such as a system administrator, or a managing program running on any computer in the network computer system 100. These static values may be stored in a shared file stored in the storage array 106 so that every host computer in the network computer system is able to access this information. Alternatively, these static values may be broadcasted to other host computers in the network computer system so that every host computer has these values from all the other host computers. As a result of the distribution, each client is assigned a dynamic reservation value, a dynamic limit value and a dynamic share value for the current monitoring time interval. These dynamic values, as well as the allocations of the storage capacity to the clients, are then recalculated for each subsequent monitoring time interval.

The local scheduler 240 in each host computer operates to schedule the IO requests by the clients, e.g., the VMs, in that host computer in accordance with the dynamic reservation values, the dynamic limit values and the dynamic share values, which were computed by the SRP module 238 in the host computer. Although the local scheduler and the SRP module are illustrated in FIG. 2 as being separate from the virtual machine monitor 230, one or both of these components may be implemented as part of the virtual machine monitor. In some embodiments, the SRP module and the local scheduler are implemented as software programs running on the host computer. However, in other embodiments, the SRP module and the local scheduler may be implemented using any combination of software and hardware.

Figure 5:
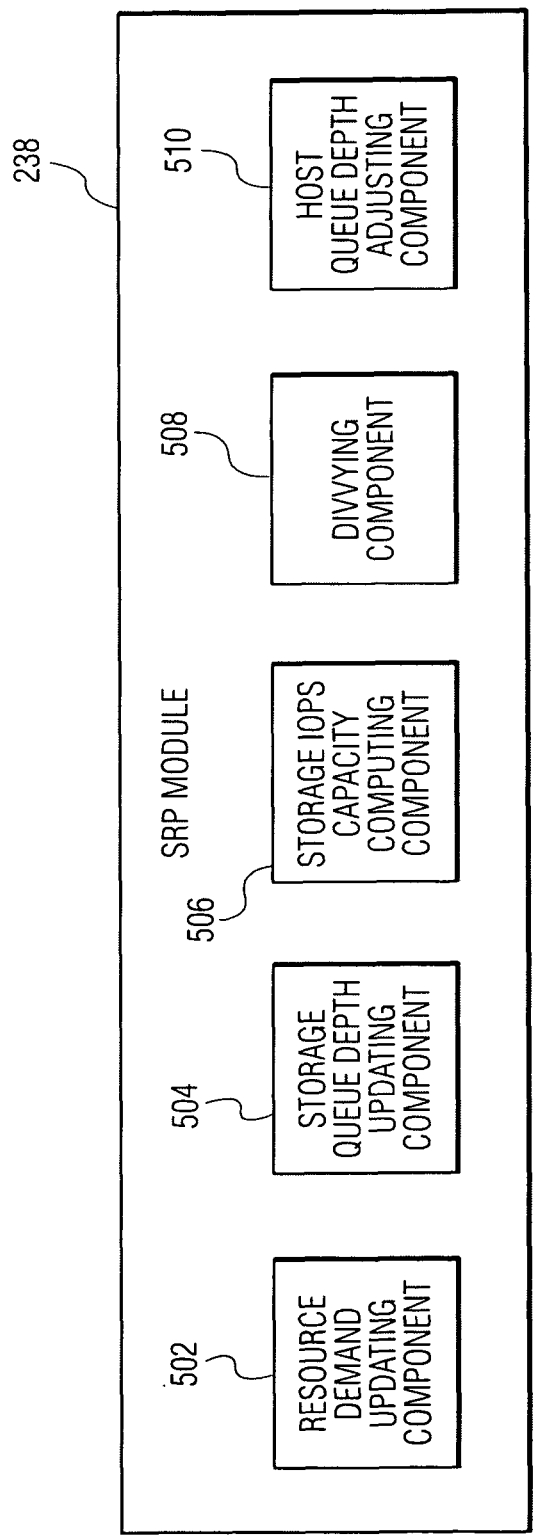
FIG. 5 is a block diagram of a storage resource pool (SRP) module included in a host computer in accordance with an embodiment of the invention.

Turning now to FIG. 5, components of the SRP module 238 in accordance with an embodiment of the invention are shown. As illustrated in FIG. 5, the SRP module includes a demand updating component 502, a storage queue depth updating component 504, a storage IOPS capacity computing component 506, a divvying component 508, and a host queue depth adjusting component 510. In the illustrated embodiment, these components of the SRP module are shown as being distinct elements. However, in other embodiments, one or more of these components may be combined with other components and/or one or more of these components may be further divided into sub-components. In an embodiment in which the SRP module is implemented as a software module, the components of the SRP module can be viewed as processing blocks of the software module. In the following description of the components of the SRP module, the clients in the host computer 104A are described as being VMs. However, as noted above, these clients can be any entities that can access the storage array 106 for the shared storage resource.

The resource demand updating component 502 of the SRP module 238 operates to update the demand of each VM in the host computer 104A for the shared storage resource and the aggregated VM demand for the host computer, i.e., the sum of the demands of all the VMs in the host computer. The resource demand updating component determines the average latency ("avgLatency") for the host computer and the average measured IOPS ("avgIops") using statistics maintained by the host computer, e.g., by the virtual machine monitor 230 or a hypervisor running on the host computer. These statistics maintained by the host computer include statistics on the aggregated latency and the total number of IOs performed by each VM of the host computer during a monitoring interval. The resource demand updating component then computes the demand for each VM in the host computer in terms of average number of outstanding IOs ("demandOIO") using the following equation derived from Little's law:

$$\text{demandOIO} = \text{avgLatency} \times \text{avgIops} \qquad \text{(Equation 1)}.$$

These values are then made available so that every host computer in the network computer system 100 can get these VM demand values in terms of outstanding IOs (OIOs). In an embodiment, these values are updated in a shared file stored in the storage array 106. Thus, every host computer in the network computer system is able to access the shared file to retrieve the demandOIO values for other host computers in the network computer system. In other embodiments, these values may be broadcasted to other host computers in the network computer system so that every host computer has these values from all the other host computers.

The resource demand updating component 502 then converts the demandOIO value to a normalized demand IOPS value ("demandIops") based on the storage device congestion threshold latency ("$L_c$") using the following equation:

demandIops=demandOIO/$L_c$ (Equation 2).

The congestion threshold is the maximum latency at which the storage device is operated. The resource demand updating components controls the storage queue depth, i.e., the depth of the request queue 112 (shown in FIG. 1), to keep the latency close to $L_c$, so that the storage array 106 is utilized in an efficient manner. This helps to avoid overestimating the demand of a VM based on local latency variations. As an example, the congestion threshold can be typically set to 30 milliseconds. For SSD-backed LUNs, $L_c$ can be set to a lower value, e.g., 5 to 10 milliseconds.

The resource demand updating component 502 then adjusts the demandIops value to make sure that the value lies within the lower and upper bounds represented by reservation and limit settings for each VM using the following equation:

demandIops=min(max(demandIops,R),L) (Equation 3).

The demand is then aggregated for the host computer by summing the demandIops values of the VMs and then applying the bound check at the host computer 104A to make sure that the aggregated value lies within the lower and upper bounds represented by reservation and limit settings for the host computer.

The storage queue depth updating component 504 of the SRP module 238 operates to update the capacity of the storage array in terms of the storage queue depth of the storage array 106, which is then allocated to each host computer in the network computer system 100, including the host computer 104A in which the SRP module is operating. The storage queue depth updating component adjust the storage queue depth to keep the measured latency within the congestion threshold using the following equation:

$$Q(t+1) = (1-\gamma)Q(t) + \gamma\left(\frac{L_c}{L(t)}Q(t)\right).$$ (Equation 4)

In the above equation, Q(t) denotes the storage queue depth at time t, L(t) is the current average latency for all the host computers, $\gamma \in [0,1]$ is a smoothing parameter and Lc is the device congestion threshold.

The storage IOPS capacity computing component 506 of the SRP module 238 operates to compute the IOPS capacity of the storage array 106. The storage IOPS capacity computing component converts the updated array queue depth value, which was computed by the storage queue depth computing component 504, to an equivalent storage IOPS capacity using the following equation derived using Little's Law:

arrayIOPS=$Q(t+1)/L_c$ (Equation 5).

The conversion from queue depth to IOPS is done because the resource pool settings used in the divvying operation performed by the divvying component 508, as described below, are in terms of user-friendly IOPS, rather than the less transparent OIO values.

The divvying component 508 of the SRP module 238 operates to compute dynamic reservation, limit and share values for the VMs that reflect the current demand distribution, as well as the entitlements of the VMs with respect to the computed arrayIOPS value. The divvying component takes as input the structure of a resource pool hierarchical structure, the static reservation, limit and shares settings on nodes of the resource pool hierarchical structure (e.g., the nodes 402A, 402B and 404 shown in FIG. 4), as well as the demands of the VMs and the nodes. The divvying component then performs operations to distribute the reservation, limit, array IOPS and share values at the root node the resource pool hierarchical structure down to the VMs.

The root node of a resource pool hierarchical structure holds four resource types that need to be divided or distributed among the nodes of the resource pool (RP) hierarchical structure:

(1) reserved RP capacity (R),
(2) RP limit (L),
(3) array IOPS (I), and
(4) total RP shares (S).

The divvying component 508 does a level-by-level pass of the resource pool hierarchical structure to divide the resources at each level of the resource pool hierarchical structure beginning with the root node. For each node of the resource pool hierarchical structure, the divvying component divides up the resources of the node among its children or child nodes. As used herein, R-divvy, L-divvy, I-divvy and S-divvy operations are operations performed by the divvying component to distribute the R, L, I and S values, respectively.

The R, L, I and S values at the root node of the resource pool hierarchical structure will sometimes be referred to herein as global R, L, I and S values.

The resulting R, L, S values for the VMs after the R-divvy, L-divvy and S-divvy operations are used as the dynamic R, L, S settings for the VMs during the next monitoring time interval. The value of I obtained per VM as part of I-divvy is known as the entitlement of the VM. During R-divvy, L-divvy and I-divvy operations, the limits of the nodes to receive shares of the R, L and I values are temporarily capped at their aggregated demands, which allows the resources to be directed to VMs that currently have higher demands.

For the R-divvy operation, the divvying component 508 will first divvy the reserved RP capacity R at the root node among its children or child nodes. At each child node, its allocated reservation is used as the capacity to divvy among its children. This process is repeated until all the VMs of the network computer system 100 have received their updated share of R. For the L-divvy and I-divvy operations, the divvying component follows a similar procedure to divvy the RP limit L and the array IOPS I so that each VM receives a new dynamic limit setting and entitlement $E_i$. For the S-divvy operation, the divvying component will divvy the total RP shares S at the root node among its children or child nodes based on the static share values of the child nodes. At each child node, its allocated shares are then divided among its children in the ratio of the children's share settings.

The divvying component 508 performs the R-divvy, L-divvy, I-divvy and S-divvy operations to try to give each child node a portion of the parent capacity in proportion to its shares, subject to their reservation and limit constraints. One algorithm to accomplish this goal is to serially give a small fixed amount of the parent capacity to a selected child node until the entire parent capacity has been distributed to the children. To illustrate this algorithm, let $a_i$ enote the allocation made to a child i at some stage of the divvying process, and $s_i$ be its share value. In this algorithm, the divvying process first gives each child node its reservation, i.e., the initial value of $a_i$ is the static reservation value of the child i. For the next quanta of the resource, the divvying process chooses the child node with the smallest normalized allocation ($a_i/s_i$) among the children that are below their static limit value, and increases its allocation by a small amount δ. The process continues until the entire parent capacity has been divvied out. A concern with this algorithm is that it has a runtime of O(log n*capacity/δ) for n VMs, which can be quite high for large capacity values. Another problem is to come up with a good value of δ. Thus, other distribution algorithm can be employed by the divvying component to divide the resources of a parent node to its child nodes in a more efficient manner.

As an example, one distribution algorithm that can be employed by the divvying component 508 for R-divvy, L-divvy and I-divvy operations involves using the demand of a node as its temporary limit (l) value during the distribution process, while its r and s values are the static reservation and share values, respectively. If the sum of the demands of the child nodes is smaller than the capacity being divvied at the parent, the static limits of the child nodes are used instead of their demands. For the R-divvy operation, the reservation set (R) at the root node is used as the capacity to divvy, while for the L-divvy and I-divvy operations, the capacities are the root limit setting (L) and the array IOPS (I), respectively. For the S-divvy operation, the parent's share value is simply divided in the ratio of the children's shares. A pseudo-code for this distribution algorithm is presented below.

---

Data: C: Capacity to divvy
Child $c_i$, $1 \leq i \leq n$, parameters: $r_i$, $l_i$, $s_i$.
Result: $a_i$: allocation computed for child $c_i$.

Variables: $w_i = s_i / \sum_{j=1}^{n} s_j$

V: Ordered set $\{v_1, v_2, \ldots v_{2n}, v_i \leq v_{i+1}\}$ of elements
from set $\{\frac{r_i}{w_i}, \frac{l_i}{w_i}, 1 \leq i \leq n\}$.
index[i]: equals k if $v_i$ is either $r_k$ or $l_k$.
type[i]: equals L (R) if $v_i$ is a limit (reservation).
Sets: RB = $\{1, \ldots n\}$, LB = $\{\ \}$, PS = $\{\ \}$.

RBcap = $\sum_{j=1}^{n} r_j$, LBcap = 0, PSwt = 0.

for each k = 1, ..., 2n do
  /*Can allocation of elements in PS be increased to $v_k$?*/
  If (PSwt* $v_k$ + LBcap + RBcap > C) then
    |_ break
  /*If type[k] is the limit of a child in PS: Transfer the child
  from PS set to LB set*/
  if (type[k] = L) then
    LB = LB ∪ {index[k]}
    LBcap = LBcap + $l_{index[k]}$
    PS = PS − {index[k]}
    PSwt = PSwt + $w_{index[k]}$
  else
    /*type[k] = R: Move child from RB to PS*/
    PS = PS ∪ {index[k]}
    PSwt = PSwt + $w_{index[k]}$
    RB = RB − {index[k]}
    RBcap = RBcap + $r_{index[k]}$
if i ∈ RB, $a_i = r_i$; /*allocation equals reservation*/
if i ∈ LB, $a_i = l_i$; /*allocation equals limit*/
/*PS members get rest of capacity in shares ratio.*/ if i ∈ PS, $a_i = \left(w_i / \sum_{j \in PS} w_j\right) \times (C - LBcap - RBcap);$

---

The above algorithm has a runtime of O(n*log n) for n VMs, bounded by the time to create the sorted sequence V. At the end of the process, some children would have been capped at their limit (LB set), some would not have received any allocation beyond their reservation (RB set), and the rest would have received allocation in proportion to their shares (PS set).

Figure 6:
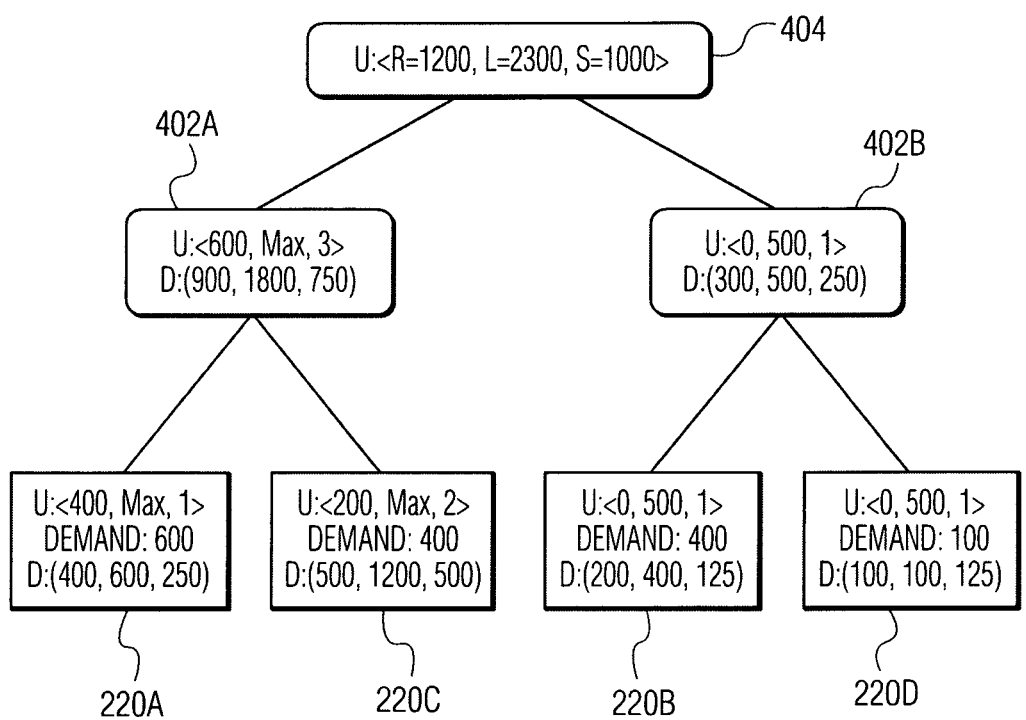
FIG. 6 is another diagram of the resource pool hierarchical structure shown in FIG. 4.

An example of the divvying process performed by the divvying component 508 is now described with reference to FIG. 6, which shows the same resource pool hierarchical structure depicted in FIG. 4. However, in FIG. 6, the static reservation, limit and share values for each node of the resource pool hierarchical structure are shown. In addition, the computed demands of the VMs 220A, 220B, 220C and 220D are shown. Furthermore, the results of the divvying process, i.e., the dynamic reservation, limit and share values, are shown for the nodes 402A and 402B and the VMs. In FIG. 6, the tuple U denotes static settings or values and the tuple D denotes the dynamic divvy results for the reservation, limit and share values. In this example, the efficient distribution algorithm described above is used for the divvying process.

For the R-divvy operation, the divvying component 508 uses the VM demands updated by the resource demand updating component 502 as temporary caps on the limit settings at the nodes of the resource pool hierarchical structure. Since the demands on the VMs are 600, 400, 400 and 100, respectively, the temporary limit caps on the VMs are set to 600, 400, 400 and 100, respectively. The divvying component also aggregates the VM demands to get the demand values for the nodes 402A and 402B. In this example, the aggregate demands for the nodes 402A and 402B are 1,000 and 500, respectively, since the sum of the demands of the VMs 220A and 220C is 1,000 and the sum of the demands of the VMs 220B and 220D is 500. Thus, the temporary limits caps on the nodes 402A and 402B are set to 1,000 and 500 respectively.

The divvying component 508 then proceeds level-by-level down from the root node 404 to the VMs 220A, 220B, 220C and 220D to divvy the parent reservation among its children. At the root node 404 of the resource pool hierarchical structure, the reservation value R, which has been set to 1,200 by a user, is divvied between the nodes 402A and 402B in the ratio of their shares (3:1), resulting in allocations of 900 and 300, respectively. Since these values lie between the reservation and limit values for the nodes 402A and 402B, these are the final results of the R-divvy operation at the root node.

At the next level of the resource pool hierarchical structure, the reservation of R=900 at the node 402A is divvied up among the VMs 220A and 220C. Based on the ratio of their shares (1:2), the VM 220A would be allocated 300 for its reservation value, which is below its reservation of 400. Hence, the divvying component 508 would actually give the VM 220A its user set reservation amount of 400 and the VM 220C would get the rest, which is a value of 500. For the VMs 220B and 220D, the reservation of R=300 at the node 402B would be divvied up equally among the VMs 220B and 220D based on the ratio of their shares (1:1). However, since the limit for the VM 220D has been temporarily capped at its demand, the VM 220D is given 100, while the VM 220B gets the remaining amount of 200.

For the L-divvy operation, the divvying component 508 similarly divides the limit values of the parents among their children, level-by-level. The user set limit of L=2300 at the root node 404 is divided among the nodes 402A and 402B in the ratio of their shares (3:1). However, the allocation to the node 402B is capped at its limit setting of 500, which results in allocations of 1,800 and 500 to the nodes 402A and 402B, respectively.

At the next level, the limit of L=1800 at the node 402A is divvied up among the VMs 220A and 220C. Based on the ratio of their shares (1:2), the VM 220A is allocated 600 for its limit value and the VM 220C is allocated 1,200 for its limit value. For the VMs 220B and 220D, the limit of L=500 would be divvied up equally among the VMs 220B and 220D based on the ratio of their shares (1:1). However, since the limit for the VM 220D has been temporarily capped at its demand, the VM 220D is given 100, while the VM 220B gets the remaining amount of 400.

For the S-divvy operation, at each level of the resource pool hierarchical structure, the divvying component 508 simply divides the shares at a parent node among its child nodes in the ratio of their shares. Thus, the user set shares of S=1,000 at the root node 404 is divided among the nodes 402A and 402B in the ratio of their shares (3:1), which results in allocation of 750 and 250 to the nodes 402A and 402B, respectively. At the next level, the share value of S=750 at the node 402A is divvied up among the VMs 220A and 220C based on the ratio of their shares (1:2), which results in allocation of 250 and 500 to the VMs 220A and 220C, respectively. In addition, the share value of S=250 at the node 402B is divvied up among the VMs 220B and 220D based on the ratio of their shares (1:1), which results in allocation of 125 and 125 to the VMs 220B and 220D, respectively.

In the above example, the VMs 220B and 220D have identical static settings. However, due to the difference in their demands, the resulting dynamic settings are different for the VMs 220B and 220D. With respect to the VMs 220A and 220C, excess reservation was given to the VM 220C over the VM 220A since the VM 220A has a higher share value. However, to meet the user-set reservation for the VM 220A, the VM 220C received less than twice the reservation of the VM 220A.

Turning back to FIG. 5, the host queue depth adjusting component 510 of the SRP module 238 operates to compute a new host queue depth value, i.e., the depth of the issue queue 236, based on the entitlements of the VMs 220A, 220B . . . 220N in the host computer 104A with respect to the array IOPS, which were computed by the divvying component 508. The host queue depth adjusting component computes the new host queue depth value using the following equation to adjust the host queue depth:

$$Q_h = Q(t+1) \times \frac{\sum_{i \in VM \text{ on host}} E_i}{arrayIOPS}, \quad \text{(Equation 6)}$$

where Q(t+1) is the array queue depth value, arrayIOPS is the array IOPS capacity, and $E_i$ is the entitlement of a VM in the host computer.

Turning back to FIG. 2, the local scheduler 240 operates to allocate the share of the array capacity for the host computer 104A, i.e., the new host queue depth value computed by the host queue depth adjusting component 510 of the SRP module 238, among its VMs 220A, 220B . . . 220N. The local scheduler uses the dynamic VM reservations, limits and shares settings computed by the SRP module to schedule the IO requests from the VMs. The local scheduler enforces the limit defined by the new host queue depth value on the total number of outstanding IOs at the host computer. In an embodiment, the local scheduler is the mClock scheduler described in "*mClock: Handling Throughput Variability for Hypervisor IO Scheduling*" by Ajay Gulati, Arif Merchant and Peter Varman. However, in other embodiments, any IO scheduler that can schedule IO requests of VMs in a host computer using the dynamic VM reservation, limit and shares settings computed by the SRP module, while abiding by the limit defined by the host queue depth value, can be used as the local scheduler.

In this fashion, each host computer in the network computer system 100 is able to independently allocate a portion of the total capacity of the storage 106 to itself based on the average latency of the storage and manage the allocated storage resource among the clients running on that host computer using the computed dynamic reservation, limit and share values, which are computed based on the demands of the clients for the shared storage resource. Thus, a centralized QoS manager/scheduler is not required for the network computer system to efficiently allocate the shared storage resource.

In some embodiments, the clients running on the host computers 104A, 104B . . . 104N may include sub-components that also require the shared storage resource. Thus, in these embodiments, these sub-components may be considered as "clients" that consume the shared storage resource. As an example, a VM running on one of the host computers may be associated with one or more virtual machine files, such as virtual machine disk (VMDKs), which are stored in the storage 106. These VMDKs of VMs consume the shared storage resource, and thus, may be assigned reservation, limit and share values to efficiently share the resource. In an embodiment, the VMDKs of VMs are also included in a resource pool hierarchical structure, and considered by the SRP module 238 and the local scheduler 240 of each host computer for QoS control.

Figure 7:
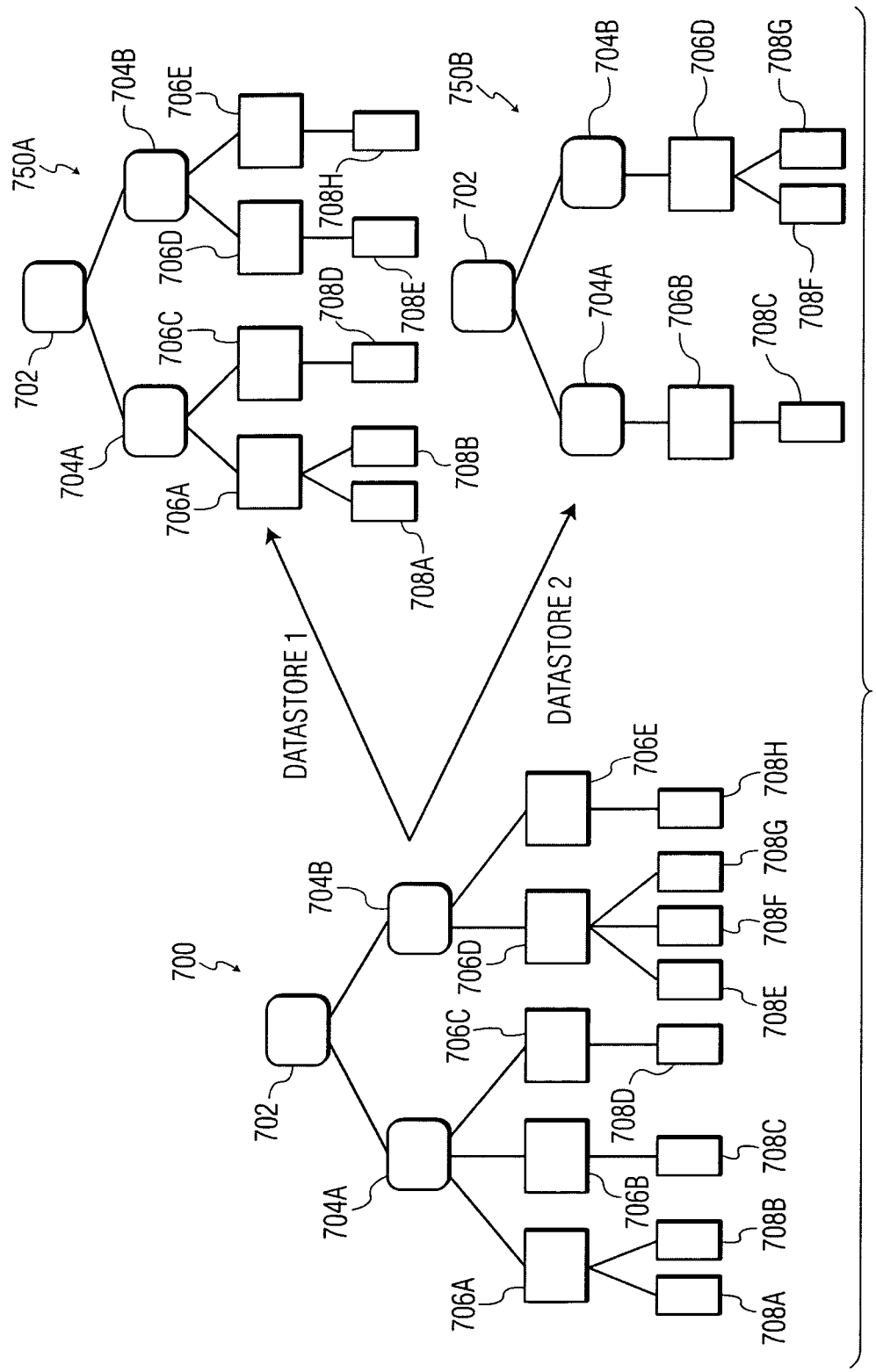
FIG. 7 is a block diagram that shows a resource pool hierarchical structure being split based on different datastores in accordance with an embodiment of the invention.

As example of a resource pool hierarchical structure 700 that includes VMDKs is shown in FIG. 7. As shown in FIG. 7, the hierarchical structure 700 includes a root node 702, nodes 704A and 704B, VMs 706A, 706B, 706C, 706D and 706E, and VMDKs 708A, 708B, 708C, 708D, 708E, 708F, 708G and 708H. For this resource pool hierarchical structure, the SRP module 238 and the local scheduler 240 of each host computer would simply distribute the capacity of the storage 106 and the global reservation, limit and share values assigned to the root node 702 down to the VMDKs in the manner described above. In some situations, the VMDKs may be stored in different datastores. For example, the VMDKs 708A, 708B, 708D, 708E, and 708H may be stored in a datastore 1 and the VMDKs 708C, 708E and 708F may be stored in a datastore 2. In these situations, the SRP module in each of the host computers 104A, 104B . . . 104N may be configured to split the resource pool hierarchical structure into per datastore resource pool hierarchical structure using datastore information, which may be provided by a user. For example, the resource pool hierarchical structure 700 may be split into resource pool hierarchical structure 750A and 750B, which correspond to the datastores 1 and 2, respectively. The SRP module in each of the host computers will then operate on each of the per datastore resource pool hierarchical structures 750A and 750B in the manner described above to provide QoS control.

Figure 8:
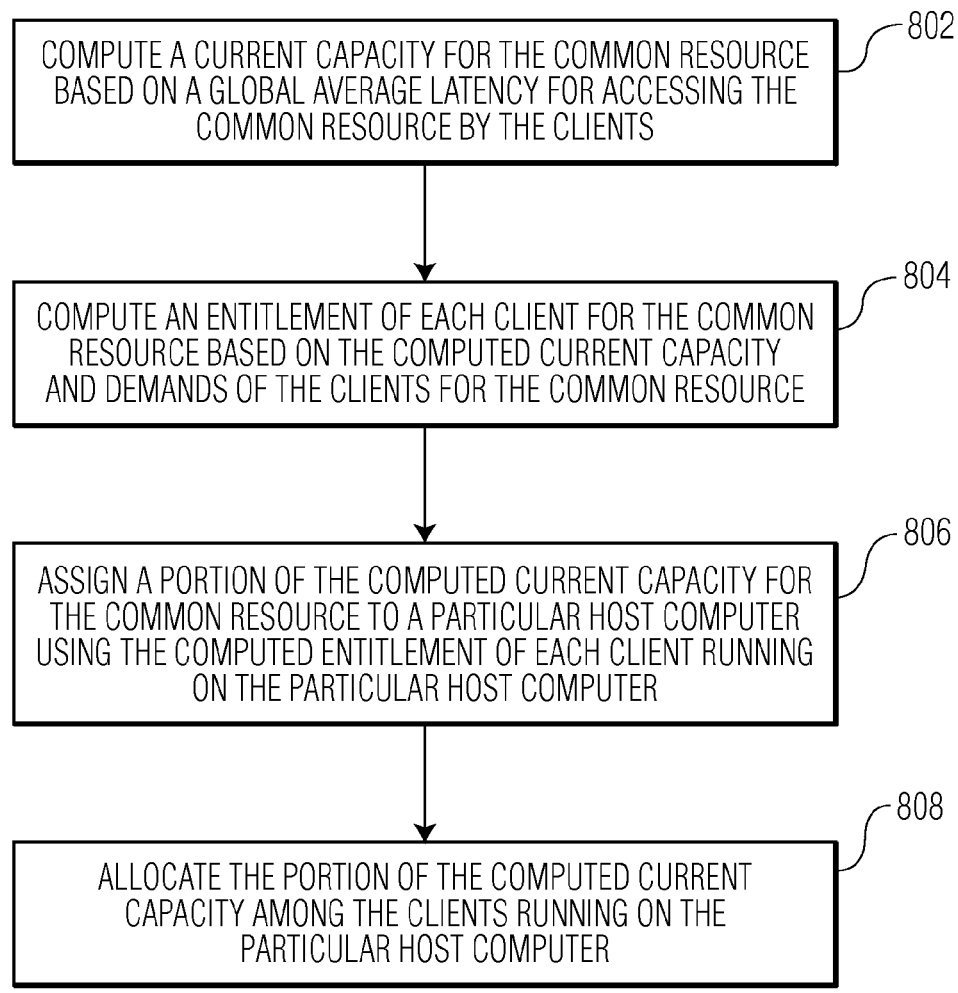
FIG. 8 is a flow diagram of a method for providing quality of service (QoS) for clients running on host computers to access a common resource in accordance with an embodiment of the invention.

A method for providing quality of service (QoS) for clients running on host computers to access a common resource in accordance with an embodiment of the invention is described with reference to a flow diagram of FIG. 8. At block 802, computing a current capacity for the common resource is computed based on a global average latency for accessing the common resource by the clients. At block 804, an entitlement of each client for the common resource is computed based on the computed current capacity and demands of the clients for the common resource. At block 806, a portion of the computed current capacity for the common resource is assigned to a particular host computer using the computed entitlement of each client running on the particular host computer. At block 808, the portion of the computed current capacity is allocated among the clients running on the particular host computer.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blue-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for providing quality of service (QoS) for clients running on host computers to access a common resource, the method comprising:
  computing a current capacity for the common resource based on a global average latency for accessing the common resource by the clients;
  computing dynamic reservation values for the clients running on the host computers by distributing a global reservation value for the common resource among the clients to derive the dynamic reservation values for the clients, including temporarily limiting the amount of the global reservation value distributed to a client to a demand of that client for the common resource; and
  allocating the computed current capacity among the clients running on the host computers using the dynamic reservation values for the clients,
  wherein the distributing of the global reservation value for the common resource among the clients includes distributing the global reservation value through a hierarchical structure of parent and child nodes such that the global reservation value at a root node of the hierarchical structure is distributed to lower nodes of the hierarchical structure in a level-by-level process.

2. The method of claim 1, wherein the allocating of the computed current capacity for the common resource includes distributing the common resource among the clients based on shares assigned to the clients.

3. The method of claim 1, further comprising computing the demand of each client running on a particular host computer using a local average latency for accessing the common resource from the particular host computer and an average number of inputs/outputs in response requests to access the common resource from that client.

4. The method of claim 3, further comprising storing the computed demand in a shared file that is accessible by each of the host computers or transmitting the computed demand to other host computers in connection with the particular host computer.

5. The method of claim 1, further comprising assigning a portion of the computed current capacity for the common resource to a particular host computer, including adjusting the depth of a host queue of the particular host computer, the host queue being used to store outstanding requests for the common resource from the clients running on the particular host computer.

6. The method of claim 1, wherein the computing the current capacity for the common resource includes computing the current capacity for the common resource using the global average latency, a smoothing parameter and a resource congestion threshold value.

7. A system comprising:
  at least one processor;
  a plurality of clients operably connected to the at least one processor;
  a resource interface with a host queue to store requests from the clients to access a common resource;
  a resource pool module operably connected to the at least one processor, the resource pool module comprising:
    a first component configured to compute a current capacity for the common resource based on a global average latency for accessing the common resource by the clients; and
    a second component configured to compute dynamic reservation values for the clients by distributing a global reservation value for the common resource among the clients to derive the dynamic reservation values for the clients, including temporarily limiting the amount of the global reservation value distributed to a client to a demand of that client for the common resource, wherein the second component is further configured to distribute the global reservation value through a hierarchical structure of parent and child nodes such that the global reservation value at a root node of the hierarchical structure is distributed to lower nodes of the hierarchical structure in a level-by-level process; and
  a scheduler operably connected to the resource pool module, the scheduler being configured to allocate the computed current capacity among the clients using the dynamic reservation values for the clients.

8. The system of claim 7, wherein the scheduler is configured to distribute the computed current capacity for the common resource among the clients based on shares assigned to the clients.

9. The system of claim 7, wherein the resource pool module is configured to compute the demand of each client using a local average latency for accessing the common resource from the host computer and an average number of inputs/outputs in response requests to access the common resource from that client.

10. The system of claim 9, wherein the resource pool module is further configured to store the computed demand in a shared file that is accessible by other host computers or configured to transmit the computed demand to other host computers in connection with the host computer.

11. The system of claim 7, wherein the resource pool module is configured to adjust the depth of a host queue of the host computer to assign a portion of the computed current capacity for the common resource to the host computer, the host queue being used to store outstanding requests for the common resource from the clients.

12. The system of claim 7, wherein the resource pool module is configured to compute the current capacity for the common resource using the global average latency, a smoothing parameter and a resource congestion threshold value.

13. A non-transitory computer-readable storage medium containing program instructions for providing quality of service to clients in host computers to access a common resource, wherein execution of the program instructions by one or more processors of the host computers the one or more processors causes the one or more processors to perform steps comprising:
  computing a current capacity for the common resource based on a global average latency for accessing the common resource by the clients;
  computing dynamic reservation values for the clients running on the host computers by distributing a global reservation value for the common resource among the clients to derive the dynamic reservation values for the clients, including temporarily limiting the amount of the global reservation value distributed to a client to a demand of that client for the common resource; and
  allocating the computed current capacity among the clients running on the host computers using the dynamic reservation values for the clients,
  wherein the distributing of the global reservation value for the common resource among the clients includes distributing the global reservation value through a hierarchical structure of parent and child nodes such that the global reservation value at a root node of the hierarchical structure is distributed to lower nodes of the hierarchical structure in a level-by-level process.

14. The non-transitory computer-readable storage medium of claim 13, wherein the allocating of the computed current capacity for the common resource includes distributing the common resource among the clients based on shares assigned to the clients.

15. The non-transitory computer-readable storage medium of claim 13, wherein the steps further comprises computing the demand of each client running on a particular host computer using a local average latency for accessing the common resource from the particular host computer and an average number of inputs/outputs in response requests to access the common resource from that client.

16. The non-transitory computer-readable storage medium of claim 13, wherein the steps further comprises the computed demand in a shared file that is accessible by each of the host computers.

17. The non-transitory computer-readable storage medium of claim 13, wherein the steps further comprises assigning a portion of the computed current capacity for the common resource to a particular host computer, including includes adjusting the depth of a host queue of the particular host computer, the host queue being used to store outstanding requests for the common resource from the clients running on the particular host computer.

18. The non-transitory computer-readable storage medium of claim 13, wherein the computing the current capacity for the common resource includes computing the current capacity for the common resource using the global average latency, a smoothing parameter and a resource congestion threshold value.

* * * * *